UNITED STATES PATENT OFFICE.

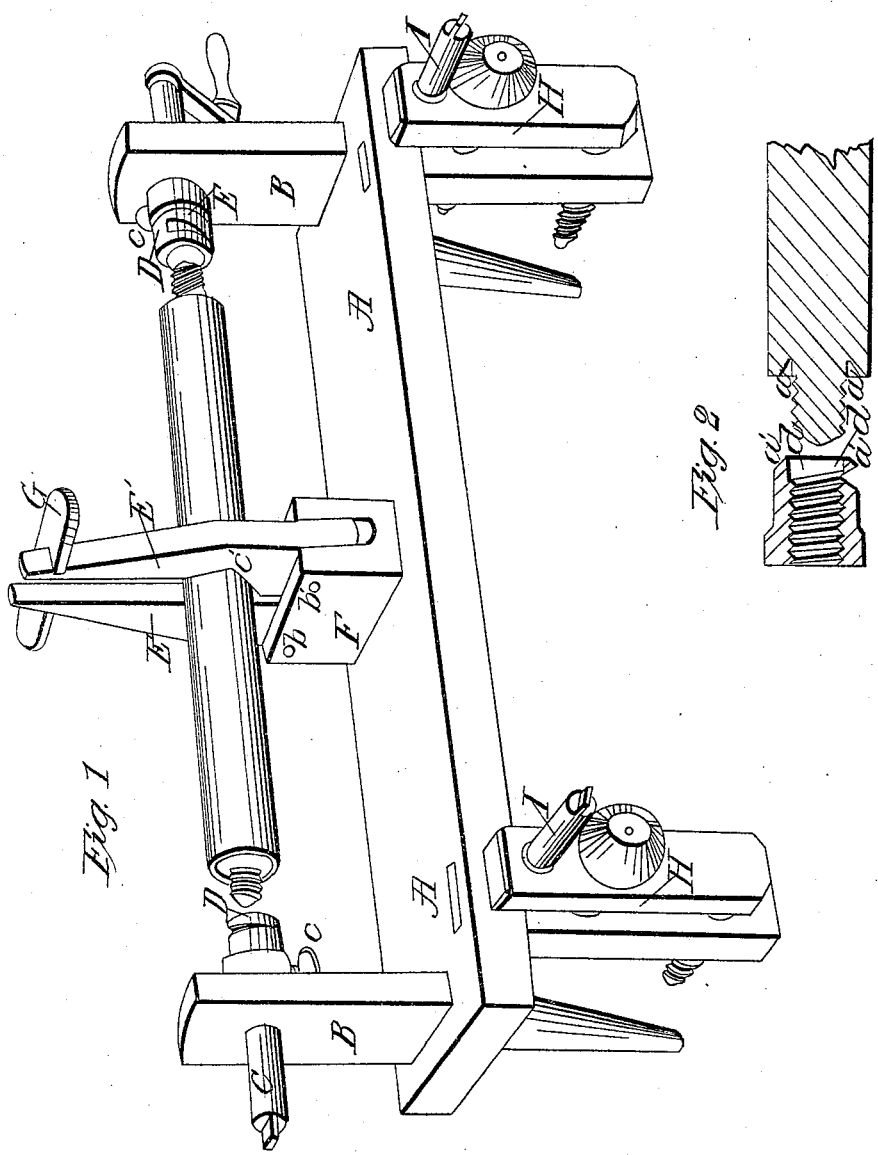

JACOB LINDLY, OF CYNTHIANA, KENTUCKY.

IMPROVEMENT IN MACHINES FOR CUTTING SCREWS UPON THE ENDS OF THE RAILS OF BEDSTEADS.

Specification forming part of Letters Patent No. 1,816, dated October 10, 1840.

*To all whom it may concern:*

Be it known that I, JACOB LINDLY, of Cynthiana, in the county of Harrison and State of Kentucky, have made a new and useful Improvement in Machines for Cutting Screws upon the Ends of the Rails of Bedsteads; and I do hereby declare that the following is a full and exact description thereof.

On the 20th day of June, 1838, I obtained Letters Patent of the United States for a machine for cutting screws on the ends of the rails and in the sides of the posts of bedsteads; and my present improvement relates to the manner of performing the former process—namely, that of cutting the screws on the ends of the rails, there not being any essential difference in the part of the apparatus for cutting the screws in the posts as then used by me. I have, however, represented the latter in the accompanying drawing as attached to the same bench with the former.

A A is a bench, which may in its general form resemble the ordinary cabinet-maker's bench. B B' are two standards which rise from this bench and sustain the cutting-tools by which a right-handed screw is to be cut on one end and a left-handed screw on the other end of a bedstead-rail. These standards must be at such distance apart as to correspond with the length of the rail upon which screws are to be cut. They are confined to the bench by means of screws or wedges bearing against its under side, and their distance apart may be adjusted by placing them in holes at set distances from each other, or they may be made to slide in a mortise or between cheeks, like the front puppet-head of a lathe. In one of these heads there is cut a right and in the other a left handed female screw of the width of thread corresponding with those to be cut upon the rail, and these receive the iron screw-shafts C C', which may be turned by means of a winch.

D D' are screw-sockets made of cast-steel, each of which has a screw on its interior of the size and kind of that on the shaft to which it appertains. These sockets must be of sufficient length to receive the pins on the ends of the rails and to take two or three turns onto the screws upon the shafts C C'.

The ordinary way of cutting screws upon wood is to insert what is called a "V" in the cutting-tool; but I dispense with this and form my cutters from the thread of the screw itself in each of the sockets D D'.

The groove E represents the mouth or opening in one of the sockets through which the chips are discharged as the cutting-edge of the thread advances. This cutting-edge is of course on the extreme outer end of the thread, and to carry the thread clear up on the tenon or pin, so that there shall be no obstruction to its coming up to a shoulder against the post, I chamfer off the front end of the sockets D D' on their outsides and turn a depression in the end of the rail to receive it, as shown in section at Fig. 2, where $a\ a$ is the depression in the end of the rail and $a'\ a'$ the chamfer on the end of the socket. The sockets are held in place on the shafts by means of tightening-screws $c$, by which they may be accurately adjusted to their places. In the outer end of the socket, where the thread commences, there is a cylindrical opening $d\ d$ to admit the end of the pin against the cutter at the end of the thread, and this serves to guide it correctly as it enters. The rail while being cut is held by its middle between two jaws E E', which work on joint-pins at $b\ b'$ in the standard E, affixed to the bench. Each of these jaws has an angular notch $c'$, which will embrace the rails firmly notwithstanding some variation in size, and these notches being at the same elevation with the screw-shafts the rail will always stand at the right height, and being held in one post only, and that at or near its middle, it will adapt itself perfectly to the cutting-sockets. G is a cramp or holdfast, by which the jaws E E' may be held together.

H H' are two jaws or wooden vises made like those ordinarily used on cabinet-makers' benches, but having through their upper ends screw-shafts I I for cutting the right and left handed screws in the posts, which they effect in such manner as to bring up the shoulders of the rails at the right point and simultaneously. When the rail is fixed for cutting, care must be taken that its shoulders stand at equal distances from the standards, and the screws will then be accurately cut, notwithstanding any variation in the length of the pins or tenons.

Having thus fully described the nature of my invention, and also explained the manner in which the same operates, what I claim therein, and desire to secure by Letters Patent, is—

1. The manner of forming the cutters for cutting the screws on the ends of the rails by making them a part of and one with the sockets or female screws D D'.

2. The manner in which I have combined and arranged these sockets, the screw-shafts, and the standards with each other, for the purpose set forth.

JACOB LINDLY.

Witnesses:
    THOS. P. JONES,
    GEORGE WEST.